United States Patent

Trehub

[15] 3,676,938
[45] July 18, 1972

[54] READING DEVICE FOR THE BLIND

[72] Inventor: Arnold Trehub, 145 Farview Way, Amherst, Mass. 01002

[22] Filed: Sept. 1, 1970

[21] Appl. No.: 68,722

[52] U.S. Cl. ................................35/35 A, 250/219 CR
[51] Int. Cl. ................................G09b 21/00, G06k 9/13
[58] Field of Search..............35/35 A; 250/219 Q, 219 CR, 250/219 QA

[56] References Cited

UNITED STATES PATENTS

| | | | |
|---|---|---|---|
| 2,500,630 | 3/1950 | Davis et al. | 35/35 A X |
| 2,420,716 | 5/1947 | Morton et al. | 35/35 A |
| 2,451,014 | 10/1948 | Zworykin et al. | 35/35 A |
| 2,487,511 | 11/1949 | Bedford | 35/35 A |
| 3,229,075 | 1/1966 | Palti | 250/219 CR |
| 3,007,259 | 11/1961 | Abma et al. | 35/35 A |
| 3,449,585 | 6/1969 | Trehub | 250/219 QA |

*Primary Examiner*—Wm. H. Grieb
*Attorney*—Amster & Rothstein

[57] ABSTRACT

An arrangement to permit blind persons to "read" printed characters by converting such characters into audible analog signals. Means are included for detecting the presence or absence of characters, their size, shape and orientation, and their grouping into words, sentences or paragraphs. Each of these identifying parameters is translated by electro-optical responsive equipment into distinctive and audible tonal sounds which are associated by the "reader" with the corresponding printed materials, thus allowing continuous comprehension of the materials.

15 Claims, 7 Drawing Figures

INVENTOR
ARNOLD TREHUB

BY Amster & Rothstein
ATTORNEYS

INVENTOR.
ARNOLD TREHUB
ATTORNEYS

READING DEVICE FOR THE BLIND

This invention relates to sensing apparatus and more particularly, to a device for enabling blind persons to read by presenting to them tonal analogs of scanned printed material.

The recent and greatly increasing availability of printed matter and written material is, of course, quite well-known. This "information explosion" has made available an almost inexhaustible supply of writings, reports, illustrations, statistics and the like for researchers, historians, and various other professional investigators. And perhaps of equal or greater significance is the availability of such information to the average general reader. In this latter area, the information explosion has taken the form of great numbers of books, magazines and various other widely distributed periodical publications.

But the blind person, while living in the midst of such proliferation of information, has been understandably cut off from it. For some time, only very halting and ineffective steps have been taken to try to provide relief for the blind, and even now, with many advances in technology having been made, there still is insufficient progress to bring the blind person into the mainstream of information dissemination. For example, the public is quite familiar with the invention by Mr. Louis Braille of the system of raised and coded character representations which bears his name. Such a system, however much it may be a boon and an advance to the blind, is still totally inadequate to permit the blind to take meaningful roles in a highly word and visually-oriented society. Thus, Braille is quite cumbersome because of the sheer bulk of publications utilizing it. Moreover, the Braille system requires special printing presses, and it is normally quite expensive to produce a publication in this manner, not to mention the lengthy learning process required on the part of the blind student to become facile in the Braille language.

More recently, some tentative steps have been taken to remedy the inability of the blind to read ordinary and conventional printed materials (e.g., magazines, newspapers, etc.) — and if any real progress is to be made in this field, it must be made with such "ordinary" printed material. However, most of the more recent proposals have proven to be rather impractical and unwieldy for a variety of reasons. Some prior art devices required the operator to manually trace a given set of characters to thereby generate signals indicative of the character's identity — and normally, such signals are not directly usable or comprehensible without further decoding, for example by analog-to-digital converters. This latter deficiency is also partially true of character recognition systems. Another approach, essentially built on the foundation of the Braille concept, has been to utilize the blind person's sense of touch to permit character identification. One such arrangement presents the blind person with tactile stimulations based on an array of vibrating wires which can take the shape of the letter being scanned. These systems have proven to be only partly effective and are generally also quite time consuming and expensive.

It is therefore an object of this invention to obviate one or more of the aforesaid difficulties.

It is also an object of this invention to permit blind persons to "read" ordinary printed characters.

It is a further object of this invention to provide apparatus to convert conventional printed material directly into audible signals instantaneously usable by and understandable to a blind person.

A device constructed in accordance with this invention includes a basic movable stylus which can be positioned over the matter to be read. The stylus is so constructed as to permit motion in any direction or orientation for both locating a particular line or sequence of characters, or to align the stylus with a given character. The graphic material is viewed through an overlying slit mask and is suitably illuminated and optically focussed onto a first image receiving surface. The image is then transferred, for example by fiber optical means, to the main optical-electronic portion of the invention which acts as an image-to-tone converter.

In addition to initially controlling the intensity of the character illumination by feedback means, the image-to-tone converter includes the basic image-receiving and transmitting structure, as well as the tone generating equipment. At least a portion of the image intensity (e.g., an image passed through a semi-silvered mirror or "beam splitter") is presented to an operational assembly including a density mask or wedge of varying light-transmittance contour. In this assembly with the wedge or mask are upper and lower margin detectors, as well as a companion space detector, all of which detectors can illustratively be formed of series-connected photodiodes which are responsive to the presence or absence of light to create particular output impedance conditions. By detecting changes in the impedance conditions, the circuitry recognizes the improper movement of the stylus over the top or bottom portion of a character, leading to a tell-tale tonal output. For example, the blockage of light to the series-connected photodiodes of the top margin detector indicates that a character segment is partially out of the scanned area (at the top). This blockage leads to a higher impedance between the terminals of the top margin detector, generating an illustrative constant high-pitched tone. Similarly, the impedance of the space detector varies when a character comes under that particular detector, also creating a distinctive tonal output to indicate the presence of a character as an advance "warning" to the reader, and then to signal the termination of the character.

Presenting an image to a density wedge having a particular light transmittance contour results in the transmission through the wedge of differing amounts of light at different points, depending both on the density contour and on the particular spacing, shape and orientation of the character portion or segment being scanned. Appropriate photocells detect the total light transmitted through the wedge. For example, one such density wedge may have a relatively low and constant density in its bottom half, with a gradually darkening density in its upper half. Such a wedge will cause the greatest amount of light interruption (as compared to a norm of no interruption for a blank background) for a character segment in its lower half, with a relatively lesser amount of light interruption for a segment in its upper half. Accordingly, in terms of the relative amount of transmitted light which is changed by the presence of the character segment, there is less of a reduction in normally transmitted light and consequently a greater amount of relative light transmission in the case of a segment in the upper half of the image field than in the lower half for this particular density wedge. Thus, such a density wedge can be characterized as being more sensitive to changes in character segments (e.g., angles, curves, etc.) which occur in the upper half of the image field.

For greater image and tonal discrimination, additional density wedges can be presented with split portions of the same basic image. Other density wedges placed in the light transmission path of such split image portions will generally have different density contours to create image sensitivity in different portions of the image field (e.g., the lower part), as will be described hereinafter.

The cumulative amount of light transmitted through the various density wedges will be electronically integrated on a point-by-point basis (see my prior U.S. Pat. No. 3,449,585, issued June 10, 1969), in accordance with the invention by transmission to a photocell which generates an output voltage in response to that cumulative light transmission. For each density wedge there will be a separate photocell. The voltage output of each photocell is fed to and controls the output of a variable frequency tone generator. An output tone is produced and is presented to one ear of the blind reader; the pitch and quality of this tone are directly responsive to the photocell's voltage output. Thus, if the photocell receiving cumulative light transmission through one density wedge produces a relatively high voltage, then that photocell's corresponding tonal generator may be arranged to also provide a relatively high frequency output tone. Similarly, a low tonal output can be generated in response to a relatively low voltage (based on relatively lesser light transmission).

Because of the responsiveness of the tonal generators to the outputs of the photocells, which are in turn controlled by the cumulative light transmission integrated "cross-products" (based on summing point-by-point transmitted light components, the generated tone will be directly related to the shape, orientation, and location of a particular character segment. Thus, the density wedge described above, upon receiving the image of a generally rising line segment in the upper portion of the image field, may be arranged to cause a similar generally rising tone to be presented to one of the earphones worn by the blind reader. By suitable practice and learning, the blind person can readily grasp the association between particular character shapes and orientations and the resulting tonal outputs. He can also maintain the proper location and position of characters within the stylus mask area by the utilization of the top and bottom margin detectors. Finally, by recognizing the distinctive and illustratively periodic tone associated with the space detector, he can also recognize when a particular word, sentence, paragraph or even page has ended. The blind person thus has acquired a direct and instantaneous comprehension of conventional graphic material presented to him on a printed page.

It is therefore a feature of an embodiment of this invention that the presence, shape and orientation of character segments are detected by electro-optical devices which generate related and comprehensible audible tones.

It is a further feature of an embodiment of this invention that tonal generators responsive to the integrated total of light transmitted through one or more density wedges furnish an indication of distinguishing positional or angular change in a scanned character.

It is still another feature of an embodiment of this invention that light-sensitive devices are utilized to control the positioning of scanned characters within a scan area, and to detect spacing between characters, words, sentences and other character groupings.

The above brief description, as well as further objects, features and advantages of the present invention, will be more fully appreciated by reference to the following detailed description of a presently preferred, but nonetheless illustrative embodiment demonstrating objects and features of the invention, when taken in conjunction with the accompanying drawing wherein.

GENERAL SYSTEM DESCRIPTION

Figure 1:
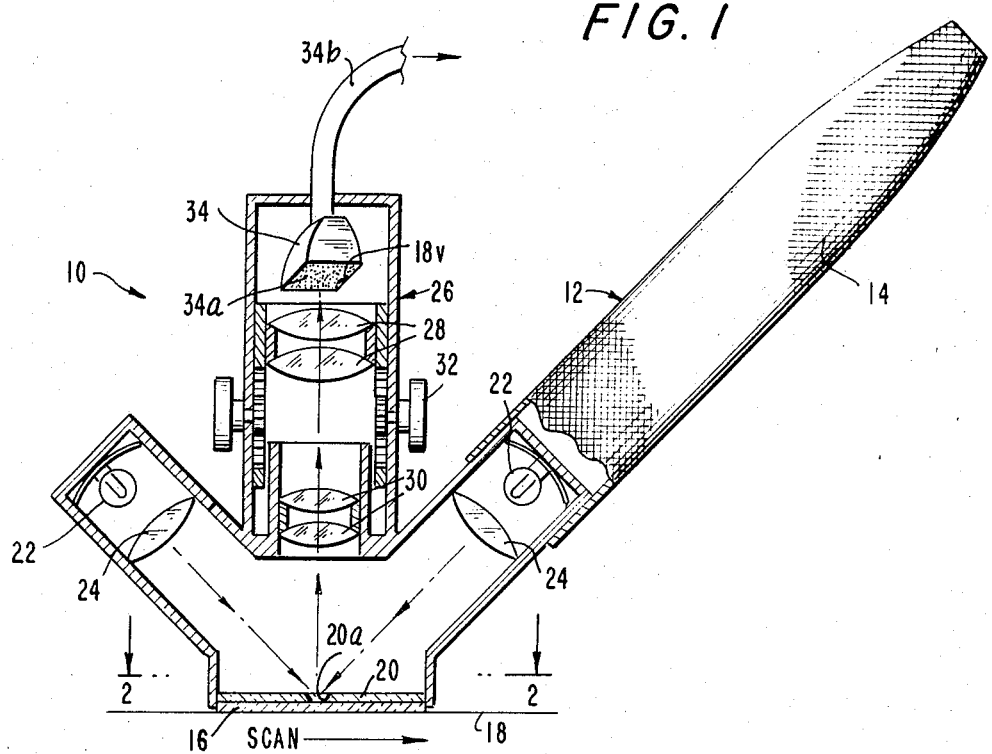
FIG. 1 is a side elevation of the pickup portion of the invention including the stylus and contained optics, positioned over reading matter to be scanned.

In the view of the scanning portion of the invention shown in FIG. 1, an assembly 10 is illustrated in position over reading matter to be scanned and detected. The assembly 10 includes a bifurcated housing 12, the right-hand portion of which can take the form of a stylus 14 adapted for gripping by the blind operator. At the bottom of the housing is a flat transparent plate 16, illustratively made of glass or rigid plastic. The plate 16 overlies the graphic material contained on surface 18, which can illustratively take the form of a book, drawing, page or the like.

Immediately above the transparent plate 16 is a directional viewing plate 20 which includes as its central portion a scanning slit or window 20a through which the printed material on surface 18 is visualized and detected by the optical system of the invention. Illumination is provided within the housing 12 for the printed material appearing within the outlines of slit 20a by means of lamps 22 which are collimated and focused by lenses 24. As indicated by the downwardly directed arrows from lenses 24, focusing light is directed into slit 20a to give suitable illumination to the printed or graphic material which directly underlies slit 20a and which appears on surface 18.

Figure 2:
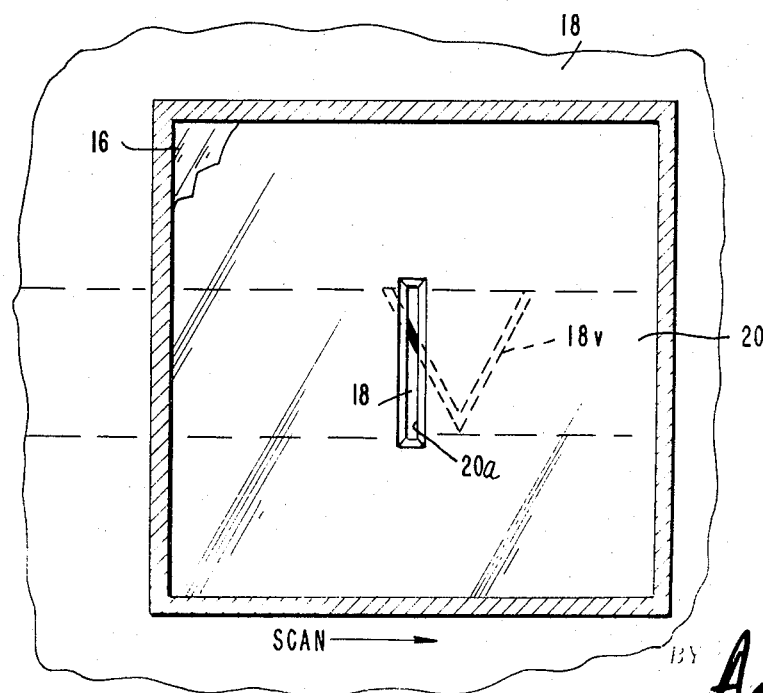
FIG. 2 is an enlarged sectional plan view of the overlying plate and slit mask arrangement illustrating the appearance of a character segment in the viewing slit, and taken along the line 2—2 of FIG. 1 in the direction of the arrows.

The enlarged plan view of FIG. 2 is taken from the perspective of line 2—2 in FIG. 1 in the direction of the downwardly directed arrows, and illustrates the general relationship between graphic material on surface 18 and overlying plate 16 and slit plate 20. Specifically, following alignment of the graphic material with respect to the top and bottom edges of slit opening 20a (as will be described hereinafter relating to the electronic margin detectors of the invention), a segment of the graphic material comes within the substantially rectangular window 20a in slit plate 20. Because of the transparent nature of plate 16 under slit plate 20, any graphic material appearing in the window 20a will be visible from above plate 20 and will be illuminated by lamps 22 as shown in FIG. 1. This illumination will ultimately present a reflected image upwardly into optical column 26 of the assembly illustrated in FIG. 1.

The scanning direction illustrated in FIGS. 1 and 2 is to the right as indicated by the horizontal arrow labelled "SCAN" in each of those figures. Thus, FIG. 2 illustrates the introduction of the upper portion of the left branch of a typical character 18v (the letter "V") into window 20a. This character 18v may be, for example, one character in a word which is being scanned. At the instant illustrated in FIG. 2, the shaded portion of the character 18v, consisting of the upper tip of the left branch of the letter "V," has just appeared in the upper right corner of window opening 20a. This particular downwardly angled character branch or segment will have a peculiar and distinctive tonal output to the blind reader, which is generated by the optical and electronic system to be described below.

At this introductory portion of the description, it is sufficient to note that the blind reader will recognize this distinctive tonal output in his earphones as indicating (a) the introduction of some character into the scanning window, and (b) that the initial branch of this character now being scanned has a downwardly angled branch starting at its upper left "-corner." On the basis of hearing that tone, the reader might generally have classified the character being scanned in that category of letters having downwardly angled branches at that location, for example the letters "V," "W" and "Y." Additional identifying indicia peculiar to the shape and appearance of the letter "V" will then be scanned; ultimately, the audio output associated uniquely with the letter "V" will be generated so as to permit complete and accurate identification by the blind reader.

To detect graphic material, the illuminated portion of the character within window 20a is reflected through conventional optical means such as lenses 28, 30. (The image of the graphic material is always in focus at pickup surface 34a because of the constant focal distance between surfaces 18 and 34a.) Adjustment of lenses 28, 30 with respect to the material appearing within window 20a is controlled by knob 32 and achieves the necessary enlargement of the image of the graphic material to fill the space between the top and bottom margin detectors (elements 46, 56 in FIG. 4). In the illustrative embodiment, knob 32, together with lenses 28 and 30, can take the form of "zoom" optics to permit extremely accurate adjustment to be made.

Accordingly, by reflection, focusing, enlargement and condensing, the image of the graphic material (e.g., character 18v) is picked up on the substantially horizontal lower surface 34a of image detecting and transfer device 34. While a number of structures are possible for device 34, a preferred embodiment of the invention includes a fiber optic converter which takes the image appearing on surface 34a and transmits it coherently over a plurality of optical fibers or arrays (e.g., glass-coated glass fibers, plastic-coated plastic fibers, etc., in accordance with accepted fiber optical and internal reflectance principles) housed within flexible rod 34b. As illustrated in FIG. 1, that portion of character 18v which has begun to cross the window area 20a (FIG. 2) and which corresponds to a portion of the left branch of the letter "V," is detected on the viewing surface 34a as indicated by the reference character 18v thereon. The fiber optical tube or rod 34b transmits this image to the image-to-tone converter portion of the invention which is illustrated in FIG. 3.

Figure 3:
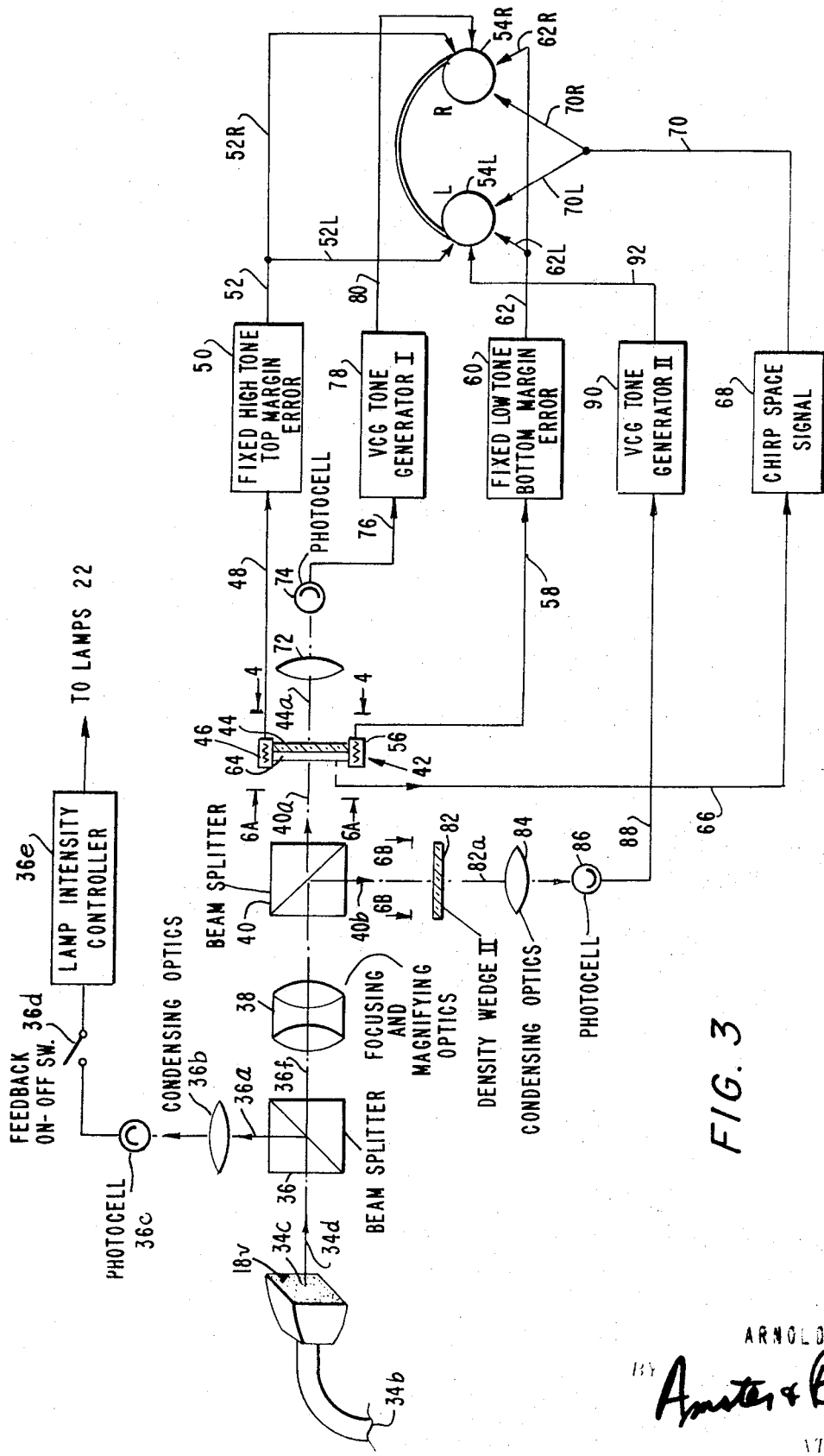
FIG. 3 is a partially schematic and block diagram of the image-to-tone converter arrangement of the invention, illustrating structure to control the illuminating intensity as well as structure for creating specific tones responsive to various character segments.

Surface 34c of fiber optical image device 34 displays the image portion of character 18v which is being visualized within slit plate window 20a, and this visualition is illustrated in FIG. 3. The transmitted image of that character segment is schematically represented in FIG. 3 by image line 34d which presents the character segment image to beam splitter 36. This is a conventional device (e.g., a prism having a diagonal semi-silvered mirror element) which directly transmits a portion of the input image and reflects another portion thereof, depending upon its relative reflectance and transmittance parameters, as is well known in the art. As illustrated in FIG. 3, a first fractional portion of the image 34d which is introduced into beam splitter 36 is reflected perpendicularly to the original image direction and acts as a feedback image 36a. After condensing by optics 36b, the cumulative amount of reflected light in that feedback portion of the image is detected by photocell 36. If the feedback switch 36d was closed to activate the feedback circuit, the voltage output of photocell 36c will be fed to lamp intensity control 36e, the output of which is connected to illuminating lamps 22 (FIG. 1).

My prior U.S. Pat. No. 3,449,585, issued June 10, 1969, also illustrates a feedback loop and lamp intensity control arrangement in its FIG. 1. The present feedback arrangement is somewhat similar, although it need not be operated on a fully continuous basis. Thus, since the primary importance of the feedback control in this invention is to maintain a constant level of reflected light from graphic material surface 18 (FIG. 1), it is necessary to make a preliminary adjustment of the illumination level of lamps 22 (i.e., by adjusting lamp intensity control 36e) only at the beginning of a particular reading "run" on any given kind of paper. Thus, assuming that the blind reader will be viewing graphic material on a page having no significant variations in reflectance quality, an initial tone and pitch adjustment will be made by the reader with respect to a blank portion of the subject paper surface. This is done by visualizing such a blank portion of the surface within the window 20a and noting the "normalized" tonal output provided by tone generators 90 and 78 to earphones 54L and 54R respectively.

It is to be noted that merely by closure of representative switch 36d, continuous feedback control can be supplied to the system — this feature might be desirable where the paper or other graphic material surface 18 does not have a uniform light-reflecting quality. If such different reflectivity is liable to occur on a given surface, such as where printed characters appear over halftone or multicolored illustrations, continuous feedback can be employed.

The image portion 36f which is transmitted through beam splitter 36 is presented to focusing and magnifying optical elements 38 which serve to focus an enlarged image on a second beam splitter element 40. The beam splitter 40 divides the image presented to it into two substantially equal intensity sub-images 40a and 40b. The image portion 40a is presented to detecting assembly 42, which will be described immediately below. The other portion 40b of the image is reflected from the diagonal semi-silvered surface of beam splitter 40 and is directed to optical filter or "density wedge" 82 and its accompanying elements. It is noted that the image portion 40b is presented to only a density wedge 82, rather than to a complete detecting assembly such as 42, which includes other detecting elements in addition to a density wedge 44. As will be appreciated from the following description, the assembly 42 also includes top and bottom margin detectors 46 and 56 respectively, as well as a space detector 64; since these three detectors completely fulfill the necessary functions of correctly positioning viewing window 20a over the reading matter on surface 18 (FIG. 1), as well as determining the spacing of different characters and groups of characters, there is no need for a second set of such detectors with respect to density wedge 82.

Figure 4:
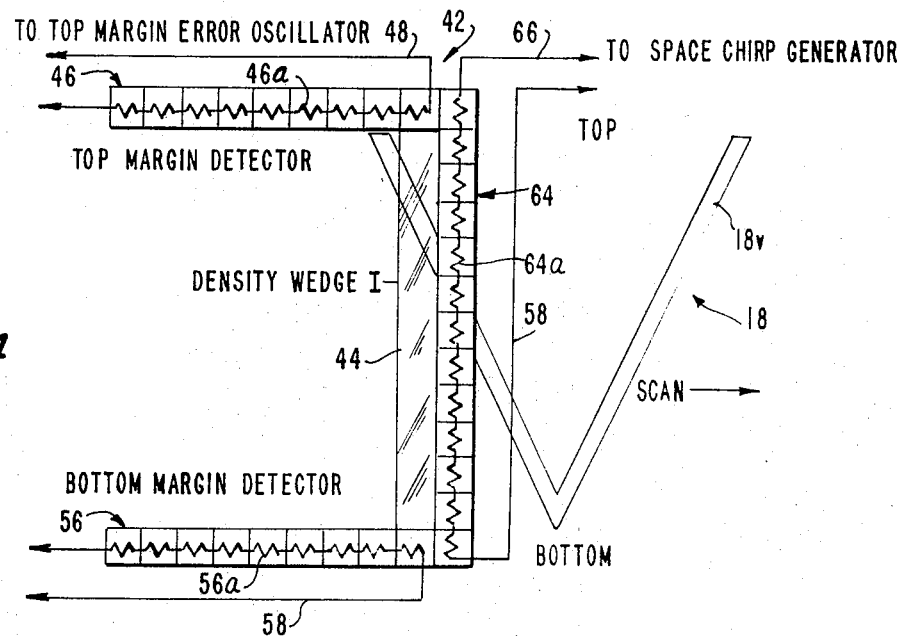
FIG. 4 is an enlarged rear view of the main density wedge assembly, showing the density wedge, the top and bottom margin detectors and the space detector, all taken from the perspective of the line 4—4 of FIG. 3 in the direction of the arrows.

What can be characterized as the principal portion of the image (insofar as it relates to presenting an image to margin and space detectors) is identified by reference character 40a, and is fed from beam splitter 40 to detector assembly 42. The assembly 42, which is shown in FIG. 4 in greater detail from a rear perspective taken from the line 4—4 in FIG. 3 in the direction of the arrows, includes density wedge 44, top margin detector 46, bottom margin detector 56 and space detector 64. The overall purpose of assembly 42 is to provide to the blind reader an audible signal consisting of tonal variations which will serve to both position characters and identify their shape, ultimately leading to the specific recognition of a character such as 18v passing under the slit opening 20a as housing 12 is moved illustratively from left to right over the graphic material.

The general operation of a "density wedge" such as 44 in connection with the incoming image portion 40a is described in my prior U.S. Pat. No. 3,449,585, issued June 10, 1969, where it is noted that a density wedge or optical filter has a varying shading pattern or contour. Such variations in the wedge permit correspondingly varying amounts of light from the image portion 40a to be transmitted through the wedge. However, in contrast to my prior disclosure, the specific utilization of the output image 44a in the present application is designed to serve a direct tonal identification purpose for the blind reader, as will be described in greater detail below.

The specific shading pattern of density wedge 44 (illustratively of the contour shown diagrammatically in FIG. 6A) will result in the furnishing to the blind reader's right earphone 54R of a specific total identification signal which may rise or fall in pitch, depending on the particular configuration of a portion of a character appearing within slit window 20a. That distinctive tonal signal is generated as follows: the output image 44a from density wedge 44 is condensed by conventional optics 72 and impinges upon photocell 74, which generates an output voltage corresponding to the cumulative intensity of the input image thereto. This voltage is transmitted along conductor 76 to voltage-responsive tone generator 78. Such tone generators are well known and produce a variable tonal output in proportion to the magnitude of their input voltages — for example, if the voltage on conductor 76 is relatively high, then tone generator 78 may be arranged to provide an output tone over lead 80 which is relatively high in pitch. This illustrative relatively high tone is then passed over lead 80 and serves as an input to the right ear of the blind reader via right earphone 54R.

Along with other tonal inputs to the blind reader's ears, this particular input, by suitable practice, will become associated with a particular shape or angular variation in a scanned character segment. The blind reader will thus develop a mental "dictionary" of sounds corresponding to particular character shapes, thus permitting identification of the scanned character.

THE TOP AND BOTTOM MARGIN DETECTORS

Margin detectors 46 and 56 serve to properly position a scanned character below the top margin and above the bottom margin of scanning window 20a (FIG. 2). As illustrated in FIG. 3, and as will be described in greater detail below with respect to FIG. 4, margin detectors 46 and 56 can illustratively take the form of a plurality of series-connected photoconductive elements well known in the art. Such elements, as is also well known, can be arranged in conjunction with a voltage source (not shown) to have a "normal" low impedance condition when light impinges on their sensitive surfaces; this results in no voltage output being present on lead 48 (for top margin detector 46) and no output appearing on lead 58 (for bottom margin detector 56). The detector elements also have a second high impedance condition which occurs when this input light is blocked. The "normal" condition would occur when the usual quantities of transmitted or reflected light are supplied to each of the series-connected photoconductive elements and they are each thus in their low impedance states. In terms of the optical system, this would mean that the scanned character or segment thereof is correctly positioned at both top and bottom margins with respect to the scanning window 20a and to the corresponding boundaries of the density wedges through which the image portions 40a and 40b must pass to insure proper tonal output and thus character identification. Such a correct position of a character with respect to both top and bottom margins is illustrated in FIGS. 2 and 4.

However, it is quite possible that the blind reader, in moving the stylus housing 12 across graphic material on surface 18, would inadvertently vary the position of the scanning window 20a with respect to the scanned character 18v — referring to FIG. 2, the scanning window 20a might be erroneously moved vertically, either up or down, and thus improperly cut off at least some small portion of the scanned character segment. Since this would result in having an inaccurate or incomplete character segment in the scanning window 20a, the blind reader might not be able to make a complete or an accurate identification of the scanned character or segment, since the ultimately generated tonal output would not precisely correspond to the actual complete segment.

For example, if the scanning stylus housing 12 is manipulated by the blind reader in such a manner as to cut off a portion of the upper character segment (i.e., by moving the housing 12 out of the paper in FIG. 1 or downward in FIG. 2), top margin detector 46 would have at least one of its photoconductive diodes 46a (FIG. 4) blocked from the input light which had previously kept it in its low impedance state. When this occurs, the impedance of the chain 46 of series-connected photoconductive elements 46a will increase sharply (there will be a greater impedance increase if more than a single photoconductive element 46a is blocked) and this increase in impedance will be detected on input lead 48 coupled to constant high tone generator 50. This generator, of conventional design, is adapted to generate a specific and illustratively high-pitched output tone when the input impedance to it increases. In the absence of such increase (i.e., when series-connected photoconductive elements 46 are not blocked from input light), no tonal output at all comes from generator 50. But when improper downward movement of the stylus with respect to a character segment cuts off some portion of that segment, the constant and relatively high tonal output is supplied at output lead 52 and thence along leads 52L and 52R to the blind reader's earphones 54L and 54R respectively.

The introduction of such a specific high tone, which will become easily recognizable to the blind reader, immediately indicates the improper positioning of the scanned window 20a with respect to the upper margin of the graphic material being scanned. Accordingly, the blind reader will then adjust housing 12, in this case by moving it in an upward direction (FIG. 2) until the constant high tone is no longer present in his earphones — this will indicate that the "normal" condition of scanning has once again been resumed and no portion of the upper segment of the scanned character is being cut off.

A quite similar positioning function is served by bottom margin detector 56. Thus, it is also possible that a blind reader might accidentally move the stylus housing 12 in a manner so as to cut off a portion of the lower part of a character segment being scanned within scanning window 20a. This would be done, for example, by accidentally and improperly moving the housing 12 into the paper (FIG. 1) or upwardly (FIG. 2). It is noted that top and bottom margin detectors 46 and 56 work in tandem to the extent that when there is a top margin error, detected as explained above, correction of this error must be sufficiently precise so as not to activate the bottom margin detector 56 — that is, the blind reader should not "overcompensate" for the top margin error by moving the housing 12 too far in an upward direction (FIG. 2) so that a portion of the bottom segment of a character is cut off — this will initiate action of the bottom margin detector 56.

This specific functioning of bottom margin detector 56 is comparable to that of top margin detector 46. Bottom margin detector 56 is comprised of a plurality of series-connected photoconductive elements 56a, each of which is in its relatively low impedance state when unblocked and exposed to the available system light associated with the transmitted image. However, should improper movement of the scanning housing cut off some part of the lower portion of a scanned character segment, one or more of photoconductive elements 56a will be blocked and will assume their relatively high impedance conditions. This impedance increase will be presented to constant low tone generator 60 over conductor 58, resulting in the generation of a constant and relatively low tonal output over conductor 62. This tonal output of generator 60 is supplied to the blind reader over leads 62L and 62R, leading respectively to left and right earphones 54L and 54R. This tone output will also become readily recognizable by the blind reader as an indication of a bottom margin error, and will thus cause the reader to make a proper adjustment of the scanning stylus housing 12, i.e., by moving the stylus out of the paper in FIG. 1 or downward in FIG. 2. Such compensating adjustment will be made until the low tonal output no longer its present in his earphones 54L and 54R, thus indicating that correct alignment of the bottom portion of the character segment with respect to the bottom edge of scanning window 20a has again been achieved. Normal left to right scanning of the graphic material can then be resumed.

THE SPACE DETECTOR

The assembly 42 also includes a space detector 64 which provides a further identifying parameter in tonal output form to the blind reader. In order to properly read graphic material, it is also necessary that the relative spacing between adjacent characters or groups of characters be determined; this is in addition to properly controlling the characters' positioning with respect to the scanning window and being able to identify the particular shape or orientation of a given character segment. Space detector 64, illustrated from an edge view in FIG. 3 and shown in greater detail in FIG. 4, also includes a plurality of series-connected photoconductive elements 64a. The "normal" condition of space detector 64, however, is such that in the unblocked or unobstructed condition, when no portion of a character segment interrupts light transmission to space detector 64 (i.e., when a space between letters or words is being scanned), the low impedance condition of series-connected photoconductive elements 64a serves as an activating input along conductor 66 to space signal generator 68.

The signal supplied to the blind reader by generator 68 can illustratively take the form of a distinctive and characteristic periodic tone which may be termed a "chirp," and this signal is presented to the blind reader over conductor 70 and to earphones 54L and 54R by way of conductors 70L and 70R respectively. Thus, when a space between scanned characters is detected, there would be no interruption or reduction in the light transmitted to series-connected photoconductive elements 64a, which would thus maintain their low impedance states and provide output "chirps" to both of the blind reader's earphones 54L and 54R from generator 68.

But when a character segment is contained within scanning window 20a and specific identifying tonal outputs are being presented to the blind reader from generators 78 and 90, the light transmission path to one or more of the photoconductive elements 64a of space detector 64 generally is partially or totally blocked, thus causing the overall impedance of space detector 64 to increase substantially. (It is noted that during scanning, the space detector 64 precedes the image projected through density wedge 44; thus, as the scan reaches the end of a character, which is followed by a space, the space detector 64 will already be activated to indicate the approach of that space.) This impedance increase is detected by generator 68 which then terminates the transmission of its "chirp" output signals to the blind reader over conductor 70. For example, FIG. 4 illustrates the introduction of a segment of the upper left branch of the letter "V" between the light transmission source (coming out of the paper) and the space detector 64; this corresponds to the actual scanning of that letter (identified as 18v) appearing in scanning window 20a in FIG. 2. At the moment illustrated, portions of four different photoconductive elements 64a are blocked by the presence of the left branch of the scanned character 18v. Such blockage causes an increase in impedance states of those four photoconductive elements and this will lead to the cessation of the chirp signals which had been supplied to the blind reader's left and right earphones 54L and 54R over leads 70L and 70R respectively.

THE OPERATION OF THE DENSITY WEDGES

The specific functioning of density wedges 44 and 82 in relation to their respective image portion inputs 40a and 40b has already been described in general terms above, and also relates to the general concept of variable light transmittance through such wedges or optical filters as described in my prior U.S. Pat. No. 3,449,585 of June 10, 1969. One possible contour for density wedge 44 is illustrated diagrammatically in FIG. 6A. The density (which varies inversely with the light transmittance factor) of wedge 44 is constant and relatively low starting at the bottom of wedge 44 and proceeding to approximately the halfway point toward the top, comprising the section 44B of wedge 44. Starting at that halfway point, the density gradually increases at a relatively constant rate, such that at the top surface of the wedge, the density is maximum and very little light would be transmitted at that point — this upper section in which the density is gradually increasing to its maximum value has been designated as 44T. The function of wedge 44 can best be described with respect to the presentation of a specific character having differently shaped or angled segments and examining the operation of the system as the segments are scanned.

DENSITY WEDGE 44

As shown in FIGS. 2 and 4, the character "V" designated as 18v has just begun to be scanned, with a portion of the left branch of the character appearing through scanning window 20a. As that upper branch of character 18v first makes its appearance under window 20a, the first portion of the density wedge 44 to be presented with that character segment is the upper righthand corner of wedge 44, corresponding to the darkest portion of that wedge's contour in section 44T. Since that part of the wedge 44 normally transmits a relatively low amount of light, the introduction of the character segment as shown in FIG. 4 will result in only a relatively small reduction in overall transmitted light.

It is important to bear in mind in this portion of the description that relative light values are significant herein, rather than absolute values. That is, the maximum light transmittance through a density wedge occurs when blank paper (i.e., no character at all) is scanned — this is the "normalized" light transmission base to which all other light transmittance quantities are compared. Accordingly, since a relatively small light interruption is caused by the introduction of the upper left branch of character 18v into the upper right corner of density wedge 44, photocell 74 will not have its cumulative light transmission input reduced very greatly. Accordingly, the voltage supplied on conductor 76 to generator 78 will be nearly the normal maximum voltage, resulting in a relatively high tone on output lead 80 supplied to the blind reader's right earphone 54R. This is an indication to the blind reader, who consults his "mental dictionary," that a character segment has made its appearance at the very upper portion of the scanning area, and this constitutes the very beginning of the identification process with respect to a particular character.

As the left-to-right scanning process continues, additional segments of the left branch of the character 18v will appear under scanning window 20a and thus will be presented to density wedge 44. As far as density wedge 44 is concerned, this will result in the right-to-left passage of a character line which angles downwardly to the right; and gradually, more and more of the left branch of the segment will cross the image path of density wedge 44. To the right edge of density wedge 44, it will appear as if the left branch of the character 18v is gradually moving downward along that edge. Relating this to the specific contour of density wedge 44, the character segment begins to interrupt light in regions of section 44T of the wedge which are gradually less dense, as indicated in the diagrammatic contour of FIG. 6A. Accordingly, more and more relative amounts of light interruption will occur as the left branch of character segment 18v appears to move downward along the right edge of wedge 44. This results in less total light being transmitted to photocell 74, and a lower voltage level transmitted along lead 76 to tone generator 78. A correspondingly reduced pitch tone is thus supplied to the right earphone 54R of the blind reader along conductor 80. Since the initial introduction of the left branch of the character 18v to the scanning area 20a, the blind reader has initially heard a relatively high tone, followed by a gradually lowering tone.

Figures 6A, 6B:
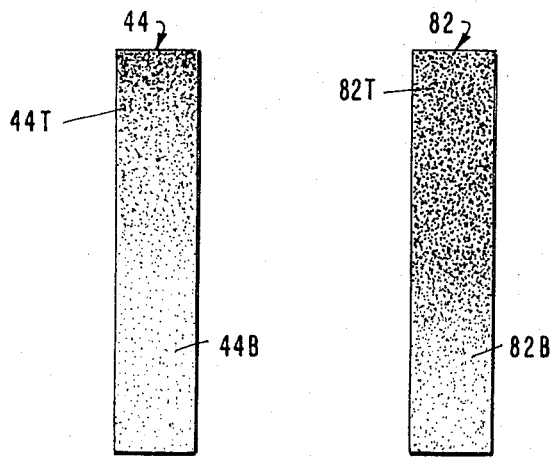
FIG. 6A is a front view of one density wedge which is used in the main image path of the invention, and which is taken from the perspective of the line 6A—6A of FIG. 3 in the direction of the arrows.
FIG. 6B is a front view of a second density wedge used in a second image path, and which is taken from the perspective of line 6B—6B of FIG. 3 in the direction of the arrows.

As scanning continues, the left branch of the character 18v reaches the mid-point of density wedge 44. As seen in FIG. 6A, the lower half 44B of wedge 44 has a contour of constant and relatively low density. Accordingly, the bottom half of the left branch of the character 18v, as it passes across the scanning window 20a and thus effectively moves "downward" through the lower half 44B of wedge 44, causes the blockage of a constant quantity of light for that branch. Thus, the amount of light interrupted by that segment of the left branch of character 18v is constant throughout the lower half of the left branch of the character; once the midpoint of the character is reached during scanning, coinciding with the beginning of constant density section 44B of wedge 44, the light output 44a which is condensed at 72 and supplied to photocell 74 does not change for the remainder of that branch of character 18v. This unchanging light quantity at photocell 74 results in a constant voltage output along conductor 76 and provides a constant and relatively low pitch tonal output from generator 78 and along conductor 80 to the right earphone 54R. The blind reader thus has heard in earphone 54R, for the left branch of the letter "V," initially a relatively high tone, followed by a gradually lowering tone which, for the bottom half of the left branch of character 18v, is both low and constant in pitch.

After the scan passes the bottom cusp of the character 18v and begins to view the right-hand branch under scanning window 20a, a different tonal variation is presented to the blind reader in his right earphone 54R. Thus, the first portion of the right branch of character 18v to be scanned in a left-to-right scanning mode is the bottom portion. As far as scanning window 20a and density wedge 44 are concerned, they view an upwardly angled segment of the right-hand branch of character 18v appearing to move from the bottom of wedge 44 toward the top thereof.

At the bottom, the initial segment of the righthand branch of character 18v, and indeed the entire lower half of that branch, blocks relatively large quantities of light presented to the lower half 44B of wedge 44 where the density contour is constant and relatively low. Accordingly, nearly maximum light blockage takes place with respect to the lower half of the right branch of character 18v, thus leading to a relatively large reduction in cumulative light transmitted to photocell 74; this reduction remains constant throughout the passage of the lower half of the right branch of character 18v through scanning window 20a. For this portion of character 18v, the blind reader is presented with a relatively low and constant tone in his right earphone 54R.

When the scan through window 20a covers the upper half of the right branch of character 18v, light blockage takes place through the uniformly increasing density which is present in the upper half 44T of density wedge 44. Accordingly, the lowermost segment of the upper half of the right branch of character 18v interrupts relatively lesser quantities of light than were blocked by wedge section 44B with respect to the lower half of the right branch of character 18v. Thus, from the constant and relatively low tone generated in response to the scanning of the lower half of the right branch of character 18v, the pitch of the tone heard in the right earphone 54R of the blind reader begins to increase as less light is blocked and more light is supplied to photocell 74 — these light values are, it is recalled, compared to the normalized quantity of light provided to photocell 74 by reflection from a blank page having no characters thereon.

The upper half of the right branch of character 18v thus leads to the presentation to right earphone 54R of the blind reader of a gradually increasing tone which reaches its highest pitch just at the upper tip of the right branch of character 18v, where the scanning of that character ends. As previously noted, when the scanning of such a character has been completed, a space will be detected by space detector 64, thus resulting in the presentation of a distinctive chirp signal to both earphones of the blind reader over leads 70L, 70R.

DENSITY WEDGE 82

While the provision of a single density wedge 44 in the light transmission path of the scanned image would probably be sufficient to give the blind reader a good tonal picture of the character, this might not always be the case. In any event, it is preferable to enhance the tonal discrimination supplied to the blind reader by providing additional tonal identification of the scanned character, e.g., by means of a second density wedge 82. Such a wedge would have a different density contour from that of wedge 44, and such differing contour can take the general appearance of that shown diagrammatically in FIG. 6B — this contour is only illustrative, as is that of wedge 44. Specifically, wedge 82 includes a lower portion 82B in which the density increases gradually from a very low level at the bottom up to the mid-point of the wedge, at which point it is relatively dense. From the mid-point to the top of wedge 82, comprising section 82T, the density remains relatively high and constant. Wedge 82 furnishes greater tonal discrimination to the blind reader by supplying a different tonal profile of the scanned character to the left earphone 54L; and wedge 82 is more sensitive to character changes or variations in the lower half of the image field, wedge 44 being sensitive to changes in the upper half. The simultaneous presentation of the two tonal profiles in earphones 54L and 54R will permit the blind reader to have a firm and positive identification of the scanned character after a period of learning and practice.

The tonal output is provided to the left earphone of the blind reader in a manner similar to that in which the varying tone for character 18v is supplied to right earphone 54R.

Briefly, as character 18v is scanned, the upper half of the left branch thereof blocks light through constant and high density section 82T of wedge 82. This results in a relatively small reduction in light supplied to photocell 86 from image 82a and condensing optics 84, reducing only slightly the voltage provided along conductor 88 to tone generator 90. This reduction remains constant throughout the scanning of the upper half of the left branch of character 18v and thus provides the left earphone 54L with a constant and relatively high tone.

When the lower half of the left branch of character 18v is scanned, light is passed through the lower half 82B of wedge 82, where the density is gradually decreasing from its darkest at the mid-point to its lightest at the bottom of wedge 82. This results in greater and greater amounts of light gradually being blocked for that portion of character segment 18v. The provision of relatively lesser amounts of light to photocell 86 results in a reduced voltage input on lead 88 to generator 90, and thus a gradually lowering tone being supplied to the left earphone 54L of the blind reader over conductor 92.

The next part of the scan views the lower half of the right branch of character 18b (following the cusp of the letter "V"), which is presented to the lower half 82B of density wedge 82. As the scanned segments of the lower half of the right branch of character 18v are scanned and appear to move upward through the wedge, initially relatively large amounts of light are blocked at the bottom of wedge 82, while as the mid-point is approached through section 82B, the density gradually increases and relatively less light blockage occurs (as compared to normalized light transmission from a blank page). Accordingly, gradually greater relative amounts of light are supplied to photocell 86, and the blind reader's left earphone 54L receives a tone which gradually increases in pitch.

The upper half of the right branch of character 18v which passes through constant high density section 82T of wedge 82 leads to the interruption of a relatively small and constant amount of light for that segment of character 18v. Accordingly, the relatively higher frequency tone which is first heard by the blind reader at the mid-point of wedge 82 is continued throughout the scanning of the upper half of the right branch of character 18v until just before the termination of scanning of that character, at which point the chirp signal from space detector 64 commences.

It can thus be appreciated that the blind reader has received in his earphones 54L and 54R a complete tonal analog of the character 18v corresponding to the letter "V". The tonal picture has varied throughout the scan from the left branch through the right branch, with increasing or decreasing pitch variations and constant tonal outputs being supplied at various portions, depending upon which earphone is involved. The recognition of this particular tonal analog or "profile" will be learned by the blind reader after having listened to it a number of times. Thereafter, when such a profile is again heard, it will be readily understood to represent the character "V". In a similar fashion, the blind reader will readily recognize the tonal patterns or profiles corresponding to all of the other letters, as well as numbers, punctuation marks and any other type of graphical material. A mental tonal "dictionary" is thereby developed by the blind reader and once a good degree of facility is obtained with the system of the invention, relatively rapid scanning and thus rapid reading is possible.

After such facility has been obtained by the blind reader with respect to individual characters, it will only be a short learning process to extend his recognition abilities to groups of such characters. By initially identifying relatively small groupings of recognizable characters, the blind reader will be able to immediately identify the characteristic tonal outputs of overall words or numerical groupings, as the case may be. Naturally, it is to be expected that greater initial facility in identifying such grouped characters may be attained with respect to commonly occurring words, while the learning process may be somewhat more gradual as regards words which appear with less frequency. Nevertheless, the invention has no limit with respect to the type or nature of character groupings which can be identified and relies only upon the tonal discrimination ability of the blind reader.

VOLTAGE CONTROLLED GENERATORS 78, 90

Figure 5:
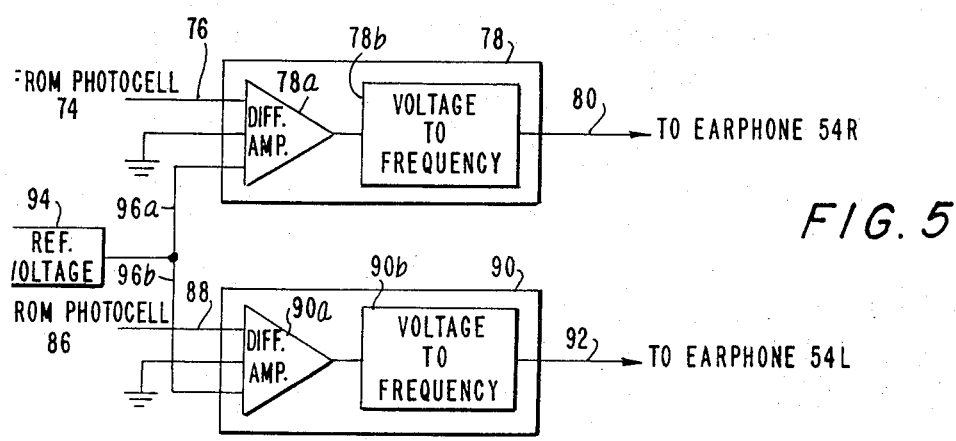
FIG. 5 is a detailed view of an illustrative construction of the voltage controlled tone generators of FIG. 3 and which produce the left and right audible tones in response to character segments.

In order to enhance the sensitivity of voltage controlled generators 78 and 90 to light variations at the density wedges, it is possible to employ differential amplifiers in connection therewith. This alternative is illustrated in FIG. 5, where a differential amplifier 78a is illustrated in conjunction with voltage-frequency block 78b; both of these components are contained within overall voltage controlled generator block 78, which also appears in FIG. 3. The input to block 78 illustrated in FIG. 5 is provided along conductor 76 which emanates from photocell 74. As will be recalled from the foregoing description, the input to photocell 74 is the cumulative light transmitted through density wedge 44 when any given character segment is scanned. By connecting reference voltage 94 along lead 96a as one input to differential amplifier 78a, the variable voltage input on lead 76 from photocell 74 can be compared to an accurate and constant reference voltage level. This may be quite advantageous with respect to "normalizing" the tonal outputs supplied along leads 80 and 92 to earphones 54R and 54L respectively.

The differential amplifier permits greater sensitivity by comparing the input voltage to a reference voltage which represents the absence of any graphic material in the scan window 20a; this reference voltage can illustratively be set so as to "null out," at the output of the differential amplifier, the voltage corresponding to the absence of graphic material. Accordingly, the audible information supplied to the reader on leads 80 and 92 are amplified signals corresponding only to the position of the character segment in the scan window, the differential amplifier having eliminated any signal attributable to the general background illumination on the graphic material surface.

Significantly, the same reference voltage 94 is supplied along lead 96b to differential amplifier 90a within voltage controlled tone generator block 90. Differential amplifier 90a is associated with voltage-frequency circuit block 90b and the input from photocell 86 on lead 88 (associated with the image transmitted through density wedge 82) is compared to the same reference voltage as is the input from the image transmitted through density wedge 44. Accordingly, the tonal variations supplied to the left earphone 54L of the blind reader along lead 92 will be based on the same control signal, associated with the common reference voltage 94, as are the tones supplied to earphone 54R along lead 80.

It is to be understood that the above-described arrangements are illustrative of the application of the principles of the invention. Numerous other arrangements may be devised by those skilled in the art without departing from the spirit and scope of the invention.

What is claimed is:

1. A system for converting graphic material into identifying audible signals comprising scanning means for viewing the field of said graphic material, means for transferring an image of said viewed graphic material from said scanning means to a converting position, means at said converting position for generating electrical signals which are analogs of said viewed graphic material and means responsive to said electrical signals for developing said audible signals corresponding to said viewed graphic material, said means at said converting position including at least one density wedge for receiving said image of said viewed graphic material and a first photocell responsive to the cumulative light intensity transmitted through said density wedge for generating a first voltage signal corresponding to the relative position and orientation of said viewed graphic material.

2. A system in accordance with claim 1 including in addition a first tone generator responsive to the amplitude of said first voltage signal to generate a first tonal sequence which is an audible analog of said viewed graphic material.

3. A system in accordance with claim 1 wherein said scanning means includes a window defining a viewing slit, and wherein said density wedge has a varying optical contour and said transmitted cumulative light intensity corresponds to the quantity of light, attributable to said viewed graphic material within said viewing slit, which is optically passed by said optical contour of said density wedge.

4. A system in accordance with claim 3 wherein said viewing slit of said scanning means is adapted to be sequentially shifted with respect to said graphic material and the magnitude of said first voltage signal varies in response to said transmitted cumulative light intensity attributable to the portions of said viewed graphic material within said viewing slit.

5. A system in accordance with claim 3 including in addition a reference voltage source, a differential amplifier responsive to said first voltage signal and to said reference voltage source for generating a sensitive output signal corresponding to the light intensity difference between said image of said field of said viewed graphic material and said image of said field in the absence of said viewed graphic material, and a tone generator responsive to the amplitude of said sensitive output signal to generate a tonal sequence which is an audible analog of said viewed graphic material within said viewing slit.

6. A system in accordance with claim 3 including in addition a first tone generator responsive to the amplitude of said first voltage signal to generate a first tonal sequence which is an audible analog of said viewed graphic material within said viewing slit.

7. A system in accordance with claim 6 wherein said means at said converting position includes in addition a second density wedge for receiving said image of said viewed graphic material, a second photocell responsive to the cumulative light intensity transmitted through said second density wedge for generating a second voltage signal corresponding to the relative position and orientation of said viewed graphic material and a second tone generator responsive to the amplitude of said second voltage signal to generate a second tonal sequence which is an audible analog of said viewed graphic material.

8. A system in accordance with claim 7 wherein said second density wedge has a varying optical contour different from that of said first density wedge.

9. A system in accordance with claim 8 wherein each of said density wedges has upper and lower sensitivity regions and said optical contour of said first density wedge is constant and relatively less dense in its lower sensitivity region and increasingly more dense through its upper sensitivity region, and said optical contour of said second density wedge is constant and relatively more dense in its upper sensitivity region and decreasingly less dense through its lower sensitivity region.

10. A system in accordance with claim 3 including in addition detector means associated with said density wedge for defining at least two margins within said viewing slit for said image of said viewed graphic material.

11. A system in accordance with claim 10 wherein said detector means comprises top and bottom margin detectors each including photoelectric means, a first tone generator coupled to said top margin detector and a second tone generator coupled to said bottom margin detector, each of said tone generators including means for normally providing no output from said generators and means including said photoelectric means for energizing said first and second tone generators to provide respective first and second distinctive audible outputs in response to the optical intersection of said top and bottom margins respectively by any of said viewed graphic material.

12. A system in accordance with claim 11 wherein said photoelectric means includes a plurality of photocells.

13. A system in accordance with claim 3 including in addition space detector means associated with said density wedge for defining a terminal border for said image of said viewed graphic material during the operation of said scanning means with respect to said graphic material.

14. A system in accordance with claim 13 wherein said space detector means includes photoelectric means positioned for monitoring said image of said viewed graphic material and for generating a space output signal in response to the termination of said viewed graphic material, and a tone generator coupled to said photoelectric means for furnishing a distinctive audible signal in response to said space output signal.

15. A system in accordance with claim 14 wherein said photoelectric means includes a plurality of photocells arrayed a said terminal border of said image presented to said density wedge, said distinctive audible signal comprising a repetitive tone provided at least as soon as said graph viewed graphic material has passed said terminal border during the operation of said scanning mean.

* * * * *